United States Patent
Mehlen et al.

(10) Patent No.: US 9,828,111 B2
(45) Date of Patent: Nov. 28, 2017

(54) METHOD OF ESTIMATION OF THE SPEED OF AN AIRCRAFT RELATIVE TO THE SURROUNDING AIR, AND ASSOCIATED SYSTEM

(71) Applicant: Thales, Courbevoie (FR)

(72) Inventors: Christian Mehlen, Etoile sur Rhone (FR); Jacques Coatantiec, Montelier (FR)

(73) Assignee: Thales, Courbevoie (FR)

( * ) Notice: Subject to any disclaimer, the term of this patent is extended or adjusted under 35 U.S.C. 154(b) by 380 days.

(21) Appl. No.: 14/797,015

(22) Filed: Jul. 10, 2015

(65) Prior Publication Data

US 2016/0325845 A1    Nov. 10, 2016

(30) Foreign Application Priority Data

Jul. 18, 2014 (FR) .................................... 14 01620

(51) Int. Cl.
  *B64D 43/02* (2006.01)
  *G01P 5/16* (2006.01)
  (Continued)

(52) U.S. Cl.
  CPC ........... *B64D 43/02* (2013.01); *G01C 23/005* (2013.01); *G01P 5/16* (2013.01); *G01P 13/025* (2013.01); *G01P 21/025* (2013.01); *G01S 19/13* (2013.01)

(58) Field of Classification Search
  CPC combination set(s) only.
  See application file for complete search history.

(56) References Cited

U.S. PATENT DOCUMENTS

2008/0066540 A1   3/2008   Childers
2010/0100260 A1   4/2010   McIntyre
(Continued)

FOREIGN PATENT DOCUMENTS

EP    2 568 295 A1    3/2013

OTHER PUBLICATIONS

Deckert, J.C., et al., "F-8 DFBW Sensor Failure Identification Using Analytic Redundancy," IEEE Transactions on Automatic Control 22(5):795-803, Oct. 1977.
(Continued)

*Primary Examiner* — Edward J Pipala
(74) *Attorney, Agent, or Firm* — Davis Wright Tremaine LLP; Michael J. Donohue

(57) ABSTRACT

Estimating the speed of an aircraft estimates three components of the speed vector (TAS, AOA, SSA) of an aircraft relative to the surrounding air. The static pressure is estimated on the basis of measurements of geographical altitude. A first intermediate variation of a linear combination of the three components of the speed vector of the aircraft relative to the surrounding air is estimated using explicitly the fact that the pressure measured by the static probe is falsified by a known quantity under the effect of the three components of this speed vector of the aircraft relative to the surrounding air. The process then estimates the three components of the speed vector of the aircraft relative to the air by likening the latter to the speed vector of the aircraft relative to an inertial reference frame and by using inertial measurements. The various estimates are fused to provide a final result.

14 Claims, 3 Drawing Sheets

(51) Int. Cl.
　　　*G01P 13/02*　　　(2006.01)
　　　*G01P 21/02*　　　(2006.01)
　　　*G01C 23/00*　　　(2006.01)
　　　*G01S 19/13*　　　(2010.01)

(56) References Cited

U.S. PATENT DOCUMENTS

| | | | |
|---|---|---|---|
| 2013/0066488 A1 | 3/2013 | Walter | |
| 2013/0317691 A1* | 11/2013 | Schott | G01P 13/025 701/30.3 |
| 2014/0257745 A1* | 9/2014 | Schegerin | G01P 5/16 702/144 |

OTHER PUBLICATIONS

Freeman, R, et al., "Air Data System Fault Modeling and Detection," Control Engineering Practice 21:1290-1301, 2013.
McGraw, G.A., et al., "Synthetic Pressure Altitude: An Alternative Means to Achieve Reduced Vertical Separation Minima Aviation Altimetry," ION 59th Annual Meeting / CIGTF 22nd Guidance Test Symposium, Jun. 23-25, 2003, Albuquerque, New Mexico, pp. 308-316.
French Search Report mailed Feb. 13, 2015, in French Patent Application No. 1401620, filed Jul. 18, 2014, 8 pages.

\* cited by examiner

METHOD OF ESTIMATION OF THE SPEED OF AN AIRCRAFT RELATIVE TO THE SURROUNDING AIR, AND ASSOCIATED SYSTEM

TECHNICAL FIELD

The present invention pertains to a method of estimation of the speed of an aircraft relative to the surrounding air, in a reference frame tied to the aircraft.

BACKGROUND OF THE INVENTION

The piloting and guidance of an aircraft requires, among other information, knowledge of the speed vector of the aircraft relative to the surrounding air, and knowledge of the barometric altitude.

This knowledge of the speed vector of the aircraft relative to the air is obtained on the basis of a set of probes which provide local measurements of pressure, of orientation of the air stream and of the temperature of the environment air, and which constitute input parameters for determining the speed vector of the aircraft relative to the air and the barometric altitude. This determination implements local aerodynamic corrections (SSEC laws, the acronym standing for "Static Source Error Correction"), which convey the matrix coupling between the local measurements and the true values of the speed vector of the aircraft relative to the surrounding air, and of the barometric altitude.

The speed vector of an aircraft relative to the surrounding air is usually expressed in spherical coordinates in a trihedron or reference frame tied to the aircraft, in the form of three components: the speed TAS of the aircraft relative to the surrounding air, the angle of attack AOA of the aircraft and the angle of sideslip SSA of the aircraft. It can also be expressed in Cartesian coordinates in the reference frame tied to the aircraft, in the form of the three components: VXair, VYair, VZair.

The operating safety of the aircraft requires that the knowledge of the speed vector of the aeroplane relative to the air and the knowledge of the barometric altitude have a sufficient level of reliability and availability.

Usually an aircraft is furnished with several suites of probes which offer physical redundancy. A device for monitoring failures is implemented so that this redundancy is handled in the best way.

Failure detection based on hardware redundancy of sensors of the same design does not make it possible to detect common-mode faults, i.e. a phenomenon capable of simultaneously affecting the proper operation of several sensors. If a fault mode can affect at least half the sensors, then the isolation of the failed sensors is no longer possible. The use of several sensors having dissimilar operating principles makes it possible to reduce the risk of common mode, at the price of increased complexity.

An alternative to physical redundancy is analytical redundancy, which consists in performing an estimation of the value of the parameter measured by a sensor, which is not impacted (or impacted as little as possible) by the failure of the actual sensor.

The estimation of the value of the parameter implements either the expression of a kinematic coupling with other sources of measurements (usually inertial measurements), or the expression of constraints of dynamic change based on flight mechanics, or on a combination of the two schemes (kinematic and dynamic).

The use of a redundancy between a sensor measurement and an estimation has diverse drawbacks.

An observer or estimator of speed of an aircraft relative to the surrounding air, constructed by kinematic coupling with the inertial measurements, can with difficulty eliminate the acceleration of the air relative to the ground. Consequently, such an observer cannot discern a failure of the sensor leading to an error in the speed of the aircraft relative to the surrounding air that is lower than the amplitude of the speed of the surrounding air relative to the ground that would be developed by a strong gust of wind.

An observer or estimator of speed of an aircraft relative to the surrounding air based on flight mechanics requires the knowledge of certain characteristic data of the aircraft (aerodynamic coefficients, mass, moments of inertia, thrust of the engines). Access to this information is not easy. It is possible to identify it in flight (by estimation techniques, explicitly or implicitly) but this operation generally turns out to be tricky.

The basic problem is the stabilization of the estimator so that the estimated measurement provides a faithful replica of reality, without directly using the measurement of the actual sensor, for fear that in case of failure of the sensor, the measurements provided by other sensors (presumed to be reliable) may not stabilize.

The estimator of the speed of an aircraft relative to the surrounding air, with kinematic coupling, with inertial measurements (cf J. C. Deckert et al, 1976, "F-8 aircraft sensor failure identification using analytical redundancy", IEEE) operates in open-loop and its performance is limited by the uncertainty in the acceleration of the air relative to the ground. To avoid a crippling rate of false alarms (failure detection with each gust of wind), the estimator must be adjusted in a slack manner, thereby prohibiting it from detecting a failure of the sensor leading to an error in the speed of the aircraft relative to the surrounding air that is lower than the amplitude of the speed of the air relative to the ground that would be caused by a strong gust of wind.

The prior art therefore tends to favour observers with dynamic coupling, on principle less sensitive to the motion of the air relative to the ground. The problem is then to ascertain with sufficient accuracy the characteristic data of the aircraft (aerodynamic coefficients, moments of inertia, thrust of the engines, mass) which come into the motion propagation equations.

Diverse techniques (explicit estimation of Kalman filtering type) are known which consist in estimating these data during learning flight phases, by using supposedly reliable sensors and by counting on trajectories offering the required observability. These techniques induce heavy operational constraints.

Other techniques (implicit estimation, such as PCA, the acronym standing for "Principal Component Analysis", SMI, the acronym standing for "Subspace Model Identification", or OKID, the acronym standing for "Observer Kalman Identifier") are also known which consist in estimating a representation of these data (and not the data directly), on-line over a longer or shorter time horizon relative to the current instant. In this case the formal validation of the performance of the observer is difficult since the analytical tie with the physics of the problem, which would have made it possible to reduce a priori the quantity of test cases to be passed in order to demonstrate the missing detection and false alarm rates, is lost.

An aim of the invention is to alleviate these problems.

SUMMARY OF THE INVENTION

There is proposed, according to an aspect of the invention, a method of estimation of the speed of an aircraft relative to the surrounding air, of the angle of attack of the aircraft, and of the angle of sideslip of the aircraft, in a reference frame tied to the aircraft, comprising:

a first step consisting in estimating a static pressure estimated on the basis of measurements of the geographical vertical speed of the aircraft, of measurements of the temperature of the surrounding air, of reinitializations of the estimated static pressure, and of a feedback of the said estimated static pressure, by integration over a vertical path of a hydrostatic equation;

a second step consisting in estimating a linear combination of a first intermediate variation of the speed of the aircraft relative to the surrounding air, of a first intermediate variation of the angle of attack of the aircraft and of a first intermediate variation of the angle of sideslip of the aircraft on the basis:

of a deviation between a variation of an estimated static pressure and a variation of a measured static pressure; and of local aerodynamic corrections dependent on the aircraft;

and consisting also in estimating a first indicator of quality of the said linear combination estimated by the second step;

a third step consisting in estimating a second intermediate variation of the speed of the aircraft relative to the surrounding air, a second intermediate variation of the angle of attack of the aircraft and a second intermediate variation of the angle of sideslip of the aircraft, on the basis of inertial measurements, of a feedback of the estimated speed of the aircraft relative to the surrounding air at output, of a feedback of the estimated angle of attack of the aircraft at output, and of a feedback of the estimated angle of sideslip of the aircraft at output, by likening the speed vector of the aircraft relative to the surrounding air to a speed vector of the aircraft relative to an inertial reference frame obtained by integration of the components of a measured acceleration vector (Inertial measurements), corrected for the kinematic effect of the reference frame tied to the aircraft and increased by the gravity projected into the reference frame tied to the aircraft; and consisting in estimating a second indicator of quality of the said second intermediate variations;

a fourth step of fusing the said second intermediate variation of the speed of the aircraft relative to the surrounding air, second intermediate variation of the angle of attack of the aircraft, and second intermediate variation of the angle of sideslip of the aircraft respectively with the said first intermediate variation of the speed of the aircraft relative to the surrounding air, first intermediate variation of the angle of attack of the aircraft, and first intermediate variation of the angle of sideslip of the aircraft, by filtering of least squares type weighted by the said first and second indicators of quality or by a filtering of Kalman type; and of fusing the said first and second indicators of quality in an indicator of quality fused on the basis of the error variance estimated by the said filtering;

and a fifth step of temporal integration of the said fusion carried out in the fourth step, using reinitializations of the estimated speed of the aircraft relative to the surrounding air, of the estimated angle of attack of the aircraft, and of the estimated angle of sideslip of the aircraft so as to deliver at output an estimated speed of the aircraft relative to the surrounding air, an estimated angle of attack of the aircraft, and an estimated angle of sideslip of the aircraft.

Such a method makes it possible to obtain an estimation of the speed of an aircraft relative to the surrounding air without using the sensors measuring this speed. It explicitly uses the fact that the pressure measured by the static probe is falsified (by a known quantity) under the effect of the speed of the aircraft relative to the surrounding air.

This method therefore provides an element of analytical redundancy which can advantageously be used for the operating safety of the aircraft.

The presence of an indicator of quality allows notably the user to dynamically manage the anomaly detection threshold when the previously estimated speed is used in a device for monitoring a sensor measuring the speed of the aircraft.

The fusion step makes it possible to combine two estimations of the components of the speed vector of the aircraft each marred by independent errors: one is affected by the motion of the isobar, the other is affected by wind turbulence. The result is a reduction in the error of the speed vector of the aircraft after fusion.

According to one mode of implementation, the said fourth fusion step uses:

a first sub-step of estimating the said linear combination on the basis of local aerodynamic corrections, of a feedback of the estimated speed of the aircraft relative to the surrounding air, of a feedback of the estimated angle of attack of the aircraft, and of a feedback of the angle of sideslip of the aircraft; and a second sub-step of correction by Kalman filtering using at input the said estimations of the linear combination that are provided by the second step and by the first sub-step.

The realization of the fourth step of fusion by a Kalman filtering offers a more effective temporal filtering than weighted least squares.

In one embodiment, the said reinitializations of the estimated static pressure of the first step use measurements of the static pressure.

These reinitializations of the estimated static pressure allow a long-term stabilization of the estimated static pressure which is necessary to temper the natural divergence related to the integration effect, to the geographical speed measurement errors, and to the effect of the motion of the isobar.

According to one embodiment, the said reinitializations of the estimated speed of the aircraft relative to the surrounding air use measurements of the speed of the aircraft relative to the surrounding air.

These reinitializations of the estimated speed of the aircraft relative to the surrounding air allow a long-term stabilization of the estimated TAS which is necessary to temper the natural divergence related to the integration effect, and to the effect of the imperfection of the coefficients of the linear combination.

The proposed method is based on an estimation with kinematic coupling, but offering much better tolerance to the motion of the air relative to the ground by virtue of the introduction of the static pressure measurement.

The following advantages are thus combined:

advantage of analytical redundancy (relative to physical redundancy): possibility of handling the common modes of failure, and lesser complexity;

advantage of estimation by kinematic coupling (relative to dynamic coupling): no need to know the characteristic data of the aircraft;

advantage of estimation by dynamic coupling (relative to kinematic coupling): lesser sensitivity to wind motion relative to the ground.

There is also proposed, according to another aspect of the invention, a system for estimation of the speed of an aircraft relative to the surrounding air, of the angle of attack of the aircraft, and of the angle of sideslip of the aircraft, in a reference frame tied to the aircraft, adapted for implementing the method such as described above, for example by means of one or more electronic calculation units.

According to another aspect of the invention, there is also proposed an aircraft comprising a system such as described above.

The invention will be better understood on studying a few embodiments described by way of wholly non-limiting examples and illustrated by the appended drawings in which:

In all the figures, elements having identical labels are similar.

Figure 1:
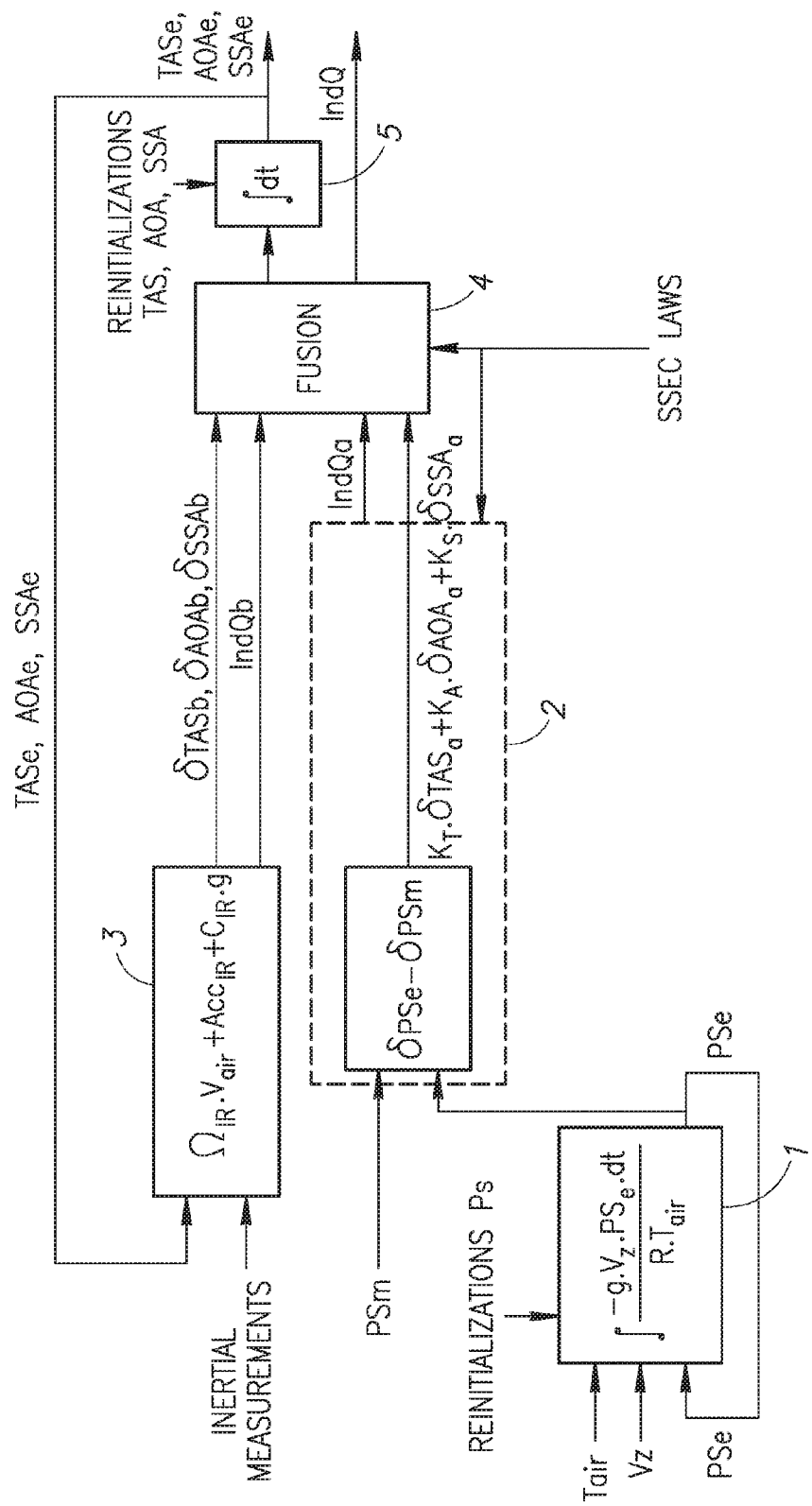
FIGS. 1 and 2 schematically illustrate a method according to an aspect of the invention.

FIG. 1 schematically illustrates a method of estimating the speed TASe of an aircraft relative to the surrounding air, in a reference frame tied to the aircraft according to an aspect of the invention.

Figure 2:
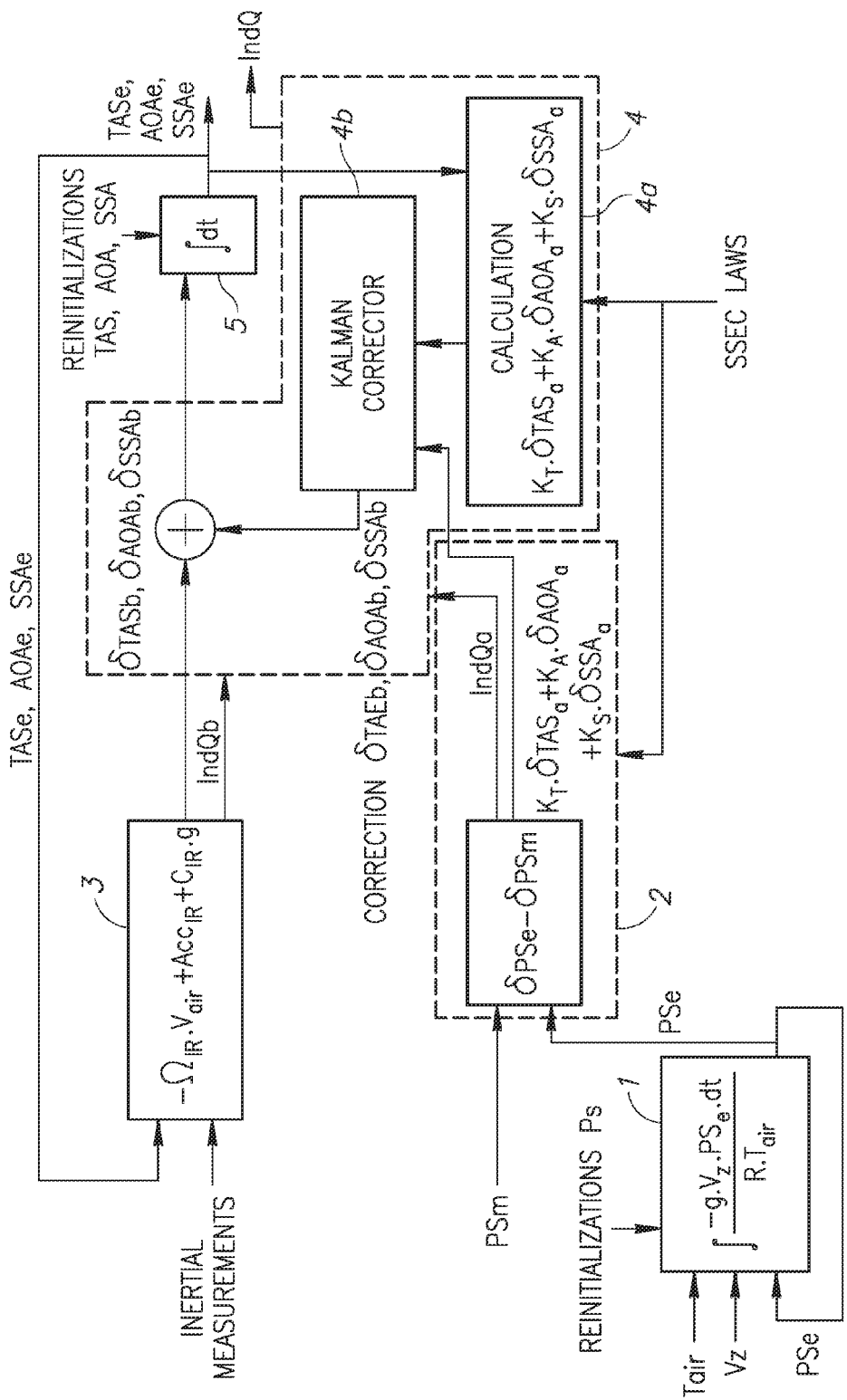

FIG. 2 illustrates techniques for data fusion.

Figure 3:
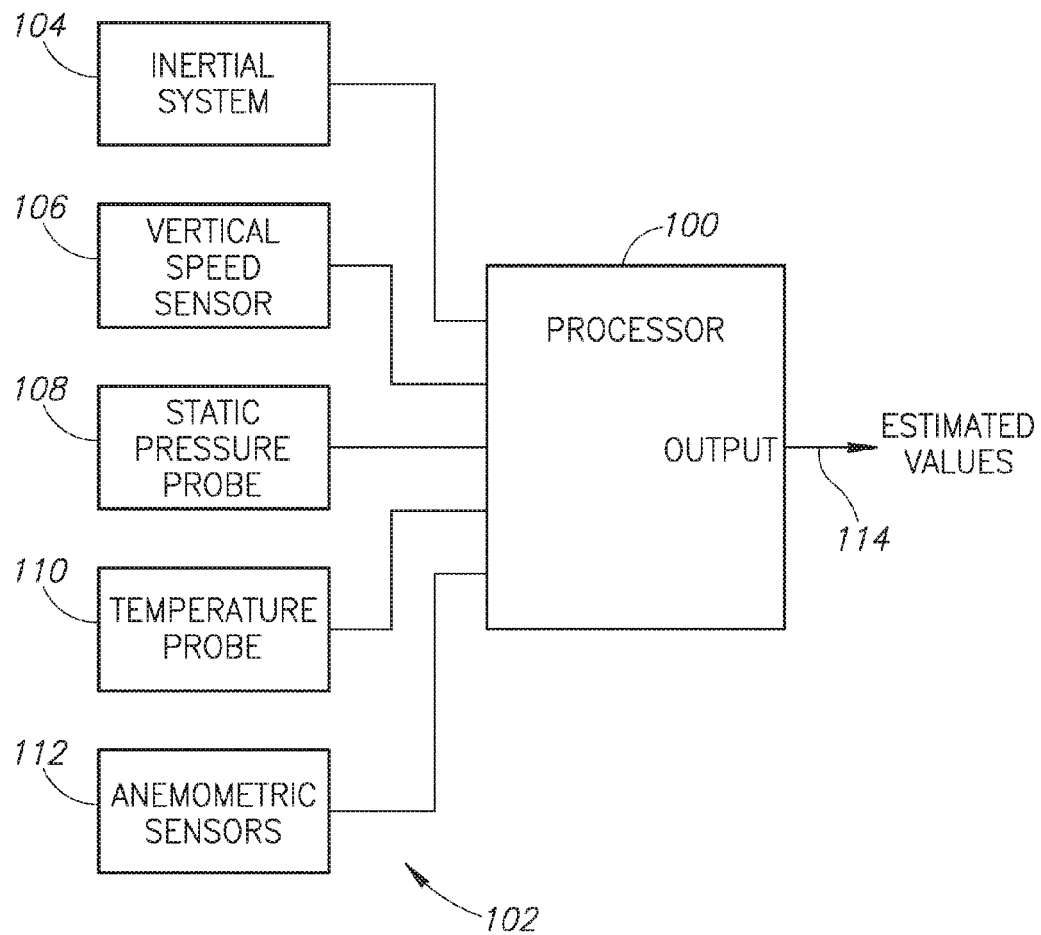

FIG. 3 is a functional block diagram of sensors and circuitry for implementing the techniques described herein.

DETAILED DESCRIPTION OF THE INVENTION

The method of estimation of the speed of an aircraft relative to the surrounding air, of the angle of attack of the aircraft, and of the angle of sideslip of the aircraft, in a reference frame tied to the aircraft, comprises:

a first step 1 consisting in estimating an estimated static pressure PSe on the basis of measurements of the geographical vertical speed Vzgeo of the aircraft, of measurements of the temperature Tair of the surrounding air, of reinitializations of the estimated static pressure PSe, and of a feedback of the said estimated static pressure PSe, by integration over a vertical path of a hydrostatic equation;

a second step 2 consisting in estimating a linear combination of a first intermediate variation δTASa of the speed of the aircraft relative to the surrounding air, of a first intermediate variation δAOAa of the angle of attack of the aircraft and of a first intermediate variation δSSAa of the angle of sideslip of the aircraft on the basis:

of the said estimated static pressure PSe and of a measurement of the static pressure PSm;

of a deviation between a variation δPSe of the estimated static pressure and a variation δPSm of the measured static pressure; and of local aerodynamic SSEC corrections dependent on the aircraft;

and consisting also in estimating a first indicator of quality IndQa of the said linear combination estimated by the second step 2;

a third step 3 consisting in estimating a second intermediate variation δTASb of the speed of the aircraft relative to the surrounding air, a second intermediate variation δAOAb of the angle of attack of the aircraft and a second intermediate variation δSSAb of the angle of sideslip of the aircraft, on the basis of inertial measurements, of a feedback of the estimated speed TASe of the aircraft relative to the surrounding air at output, of a feedback of the estimated angle of attack AOAe of the aircraft at output, and of a feedback of the estimated angle of sideslip SSAe of the aircraft at output, by likening the speed vector of the aircraft relative to the surrounding air to an inertial speed vector relative to an inertial reference frame obtained by integration of the components of a measured acceleration vector inertial Measurements, which is corrected for the kinematic effect of the reference frame tied to the aircraft and increased by the gravity projected into the reference frame tied to the aircraft; and consisting in estimating a second indicator of quality IndQb of the said second intermediate variations δTASb, δAOAb, δSSAb;

a fourth step 4 of fusing the said second intermediate variation δTASb of the speed of the aircraft relative to the surrounding air, second intermediate variation δAOAb of the angle of attack of the aircraft, and second intermediate variation δSSAb of the angle of sideslip of the aircraft respectively with the said first intermediate variation δTASa of the speed of the aircraft relative to the surrounding air, first intermediate variation δAOAb of the angle of attack of the aircraft, and first intermediate variation δSSAb of the angle of sideslip of the aircraft, by filtering of barycentre type weighted by the said first and second indicators of quality IndQa, IndQb or by a filtering of Kalman type; and of fusion of the said first and second indicators of quality IndQa, IndQb into a fused indicator of quality IndQ on the basis of the error variance estimated by the said filtering; and a fifth step 5 of temporal integration of the said fusion carried out in the said step 4, using reinitializations of the estimated speed of the aircraft relative to the surrounding air, of the estimated angle of attack of the aircraft, and of the estimated angle of sideslip of the aircraft SSA so as to deliver at output an estimated speed TASe of the aircraft relative to the surrounding air, an estimated angle of attack AOAe of the aircraft, and an estimated angle of sideslip SSAe of the aircraft.

The first step 1 consisting in estimating an estimated static pressure PSe can be carried out as follows.

The static pressure at a given point is obtained by integrating (along the vertical path) the conventional hydrostatic equation:

$$dPS_e = -\rho \cdot g \cdot dz_{geo} = -\frac{PS_e}{RT_{air}} \cdot g \cdot dz_{geo}$$

$$dPS_e = -\frac{g}{R} \cdot \frac{PS_e}{T_{air}} \cdot dz_{geo}$$

with R the air constant (R=287 m²/K·s²), and $z_{geo}$ the geographical altitude.

Integration of the differential equation requires an initial value of the pressure and a knowledge of the temperature along the vertical path. The baro-standard altitude (ISA, the acronym standing for "International Standard Atmosphere") is thus based on a "mean" model of the temperature (15° C. at sea level, and then linear decrease to 6.5° C./km). The fact that the actual temperature at sea level is different from 15° C. and that the vertical temperature gradient below the current point is not strictly constant=6.5° C./km will lead to a different static pressure ISA from the actual static pressure.

The equation hereinabove is merely the first term of the general equation of change for $PS_e$:

$$dPS_e = \frac{\partial PS_e}{\partial z} \cdot dz + \frac{\partial PS_e}{\partial l} \cdot dl + \frac{\partial PS_e}{\partial t} \cdot dt$$

The second term of the sum conveys the variation of $PS_e$ along the horizontal (without changing altitude), the third conveys the temporal variation of $PS_e$ (while remaining at the same location).

By retaining the first term we thus obtain the equation of change for $PS_e$:

$$\dot{PS}_e = -\frac{1}{R \cdot T} \cdot g \cdot V_{Zgeo} \cdot PS_e + \xi_P \qquad (eq\ 1)$$

The term $\xi_P$ corresponds to the disturbance of the atmosphere that cannot easily be modelled (terms in dl and dt).

The magnitude $V_{zgeo}$ is the geographical speed measured by an inertial system or a GPS receiver. The temperature Tair is the air temperature measured by a temperature probe.

The formulation for the open-loop observer of Ps is thus obtained:

$$PS_e(t_n) = PS_e(t_{n-1}) \cdot \left[1 - (t_n - t_{n-1}) \cdot \frac{g}{R} \cdot \frac{V_{Zgeo}(t_{n-1})}{T_{air}(t_{n-1})}\right] \qquad (eq\ 2)$$

In practice, the summary measurement provided by this open-loop observer will tend to stray from the actual values on account 1) of the errors in geographical speed measurement and in air temperature, and 2) of the disturbances of the atmosphere (variation of the isobar relative to geographical altitude).

The first step 1 also uses reinitializations of the estimated static pressure PSe for example by periodic reinitializations by means of the static pressure arising from the static pressure measurement rig (raw static pressure measured and corrected by the SSEC laws) or by setting up an exterior loop which uses this same measured and corrected static pressure to construct a slow correction.

The second step 2 consisting in estimating a linear combination of a first intermediate variation δTASa of the speed of the aircraft relative to the surrounding air, of a first intermediate variation δAOAa of the angle of attack of the aircraft and of a first intermediate variation δSSAa of the angle of sideslip of the aircraft can be carried out as follows.

The static pressure is the sum of the pressure PSm measured by the static probe and of the SSEC correction for the effect of the speed (impact of the mach, of the angle of attack of the aircraft AOA, and of the angle of sideslip of the aircraft SSA).

We write that the speed of variation of the static pressure is the sum of the speed of variation of the pressure PSm and of the speed of the SSEC correction:

$$\frac{dPS_e}{dt} = \frac{-g \cdot V_{Zgeo} \cdot PS_e}{R \cdot T} =$$

$$\frac{dPS_m}{dt} + \frac{dCor}{dt} = \frac{dP_m}{dt} + \frac{\partial Cor}{\partial M} \cdot \frac{dM}{dt} + \frac{\partial Cor}{\partial AOA} \cdot \frac{dAOA}{dt} + \frac{\partial Cor}{\partial SSA} \cdot \frac{dSSA}{dt}$$

With:
Cor representing the SSEC correction to be applied to the measured static pressure to obtain the true static pressure, in Pascals;
M representing the Mach, dimensionless
A summary measurement of the variation of a linear combination of M, AOA, SSA is thus obtained:

$$K_M \cdot \delta M + K_A \cdot \delta AOA + K_S \cdot \delta SSA = \frac{-g \cdot V_{Zgeo} \cdot PS_e \cdot \delta t}{R \cdot T_{air}} - \delta P_m \qquad (eq\ 3)$$

by writing $$\frac{\partial Cor}{\partial M} = K_M \quad \frac{\partial Cor}{\partial AOA} = K_A \quad \frac{\partial Cor}{\partial SSA} = K_S.$$

The coefficients $K_M$, $K_A$, $K_S$, which constitute the coefficients of the linear combination, are calculated on the basis of the aircraft's SSEC correction laws, at the current point of the flight domain.

Moreover, as the speed of an aircraft relative to the surrounding air TAS is related to the Mach by TAS=$\sqrt{\gamma \cdot R \cdot T_{air}} \cdot M$ (denoting by γ the ratio of the specific heats of air at constant volume and pressure, by R the ideal gas constant, and by $T_{air}$ the temperature of the air) it is possible to reformulate equation 3 by introducing the TAS rather than the Mach M:

$$K_T \cdot \delta TAS + K_A \cdot \delta AOA + K_S \cdot \delta SSA = \qquad (eq\ 4)$$

$$\frac{-g \cdot V_{Zgeo} \cdot PS_e \cdot \delta t}{R \cdot T} - \delta PS_m = \delta PS_e - \delta PS_m$$

with $K_T = K_M / \sqrt{\gamma \cdot R \cdot T_{air}}$

An estimation is thus obtained of the variation of a linear combination of the speed of an aircraft relative to the surrounding air, of the angle of attack of the aircraft, and of the angle of sideslip of the aircraft, which are three magnitudes that completely define the speed vector of the aircraft relative to the surrounding air.

The performance gain depends on the amplitude of the coefficients $K_T$, $K_A$, et $K_S$.

These coefficients $K_T$, $K_A$, $K_S$ are calculated on the basis of the SSEC correction laws, which themselves depend on the topology of mounting of the probes on the aircraft and on the current point of the flight domain. When the SSEC corrections are known in the form of polynomials, the calculation of the coefficients consists of a simple differentiation. When the corrections are known in tabulation form, they should be reformulated in polynomial form by applying a fitting scheme.

The quality of the estimation is all the more effective the larger the coefficients, that is to say the more the mounting topology is such that the speed vector $V_{air}$ of the aircraft relative to the surrounding air significantly falsifies the measurement PSm produced by the static probe.

The second step 2 also estimates the first indicator of quality IndQa of the said linear combination ($K_T \cdot \delta TAS + K_A \cdot \delta AOA + K_S \cdot \delta SSA$) estimated by the second step 2, dependent on the said coefficients of the said linear combination $K_T$, $K_A$, $K_S$, the accuracy of the measurements involved in the calculation of variations of the speed of the aircraft relative to the surrounding air, (geographical vertical speed Vzgeo, air temperature Tair), and the standard deviation of the speed of variation of the isobar, itself dependent on the horizontal and vertical speeds of the aircraft according to a modelling well known to the person skilled in the art.

The third step 3 consists in estimating a second intermediate variation $\delta TASb$ of the speed of the aircraft relative to the surrounding air, a second intermediate variation $\delta AOAb$ of the angle of attack of the aircraft and a second intermediate variation $\delta SSAb$ of the angle of sideslip of the aircraft, on the basis of inertial measurements, of a feedback of the estimated speed TASe of the aircraft relative to the surrounding air at output, of a feedback of the estimated angle of attack AOAe of the aircraft at output, and of a feedback of the estimated angle of sideslip SSAe of the aircraft at output, by likening the speed vector of the aircraft relative to the surrounding air to an inertial speed vector relative to an inertial reference frame obtained by integration of the components of a measured acceleration vector inertial Measurements, which is corrected for the kinematic effect of the reference frame tied to the aircraft and increased by the gravity projected by likening the speed vector of the aircraft relative to the surrounding air to an inertial speed vector relative to an inertial reference frame obtained by integration of the components of a measured acceleration vector inertial Measurements, which is corrected for the kinematic effect of the reference frame tied to the aircraft and increased by the gravity projected into the reference frame tied to the aircraft; and consisting in estimating a second indicator of quality IndQb of the said second intermediate variations $\delta TASb$, $\delta AOAb$, $\delta SSAb$.

The fourth step 4 consists in fusing the said second intermediate variation $\delta TASb$ of the speed of the aircraft relative to the surrounding air with the said first intermediate variation $\delta TASa$ of the speed of the aircraft relative to the surrounding air by filtering of barycentre type weighted by the said first and second indicators of quality IndQa, IndQb or by a filtering of Kalman type, and in fusing said first and second indicators of quality IndQa, IndQb into a fused indicator of quality IndQ on the basis of the error variance estimated by the filtering operation.

Thereafter, the fifth step 5 consists in carrying out a temporal integration of the fusion carried out in the fourth step 4, by using reinitializations of the estimated speed of the aircraft relative to the surrounding air, of the estimated angle of attack of the aircraft, and of the estimated angle of sideslip of the aircraft so as to deliver at output 114 (see FIG. 3) an estimated speed TASe of the aircraft relative to the surrounding air, an estimated angle of attack AOAe of the aircraft, and an estimated angle of sideslip SSAe of the aircraft.

The estimated speed TASe of the aircraft relative to the surrounding air, the estimated angle of attack AOAe of the aircraft, and the estimated angle of sideslip SSAe of the aircraft, can be reused in the second step 2 to intervene in the calculation of the coefficients $K_T$, $K_A$, and $K_S$ since they depend on the current point of the flight domain.

The third step 3 also uses reinitializations of the estimated speed TASe of the aircraft relative to the surrounding air, of the estimated angle of attack AOAe of the aircraft, and of the estimated angle of sideslip SSAe of the aircraft, for example by periodic reinitializations by means of actual measurements or by setting up an exterior loop which uses the actual measurements to construct a slow correction (slow relative to the fast correction arising from the static pressure estimator). The actual measurements mentioned are those arising from the rig for actual measurements of the speed of the aircraft relative to the surrounding air, i.e. the rigs for measuring the speed TAS of an aircraft relative to the surrounding air, the angle of attack AOA of the aircraft, and the angle of sideslip SSA of the aircraft.

The third step 3 of estimating a second intermediate variation $\delta TASb$ of the speed of the aircraft relative to the surrounding air, of a second intermediate variation $\delta AOAb$ of the angle of attack of the aircraft, and of a second intermediate variation $\delta SSAb$ of the angle of sideslip of the aircraft can be carried out as follows.

The vector Vair of speed of the aircraft relative to the surrounding air can be expressed either in the form of three Cartesian coordinates Vxair, Vyair, and Vzair in the reference frame tied to the aircraft, or in the form of three spherical coordinates TAS, AOA, SSA in the reference frame tied to the aircraft.

The relation which links these two forms of representation is as follows:

$$V_{air} = \begin{bmatrix} Vx_{air} \\ Vy_{air} \\ Vz_{air} \end{bmatrix} = \begin{bmatrix} TAS \cdot \cos AOA \cdot \cos SSA \\ TAS \cdot \sin SSA \\ TAS \cdot \sin AOA \cdot \cos SSA \end{bmatrix} \quad (eq\ 5)$$

The equation of propagation of the inertial speed vector of the aircraft expressed in the reference frame tied to the aircraft is now considered. The derivative of this vector with respect to time is equal to the acceleration measured by the accelerometers, corrected for the kinematic effect of the reference frame tied to the aircraft and increased by the gravity projected into the reference frame tied to the aircraft:

$$\dot{V}_I = -\Omega_{IR} \cdot V_I + Acc_{IR} + C_{IR} \cdot g \quad (eq\ 6)$$

in which $Acc_{IR}$ represents the inertial acceleration vector, $\Omega_{IR}$ represents the matrix of the pqr values, the pqr values being the three components of the inertial rotation speed vector), and $C_{IR}$ represents the coefficients for projecting the vertical into the reference frame tied to the aircraft:

$$\Omega_{IR} = \begin{bmatrix} 0 & -r & q \\ r & 0 & -p \\ -q & p & 0 \end{bmatrix} \quad C_{IR} = \begin{bmatrix} -\sin\theta \\ \cos\theta \cdot \sin\varphi \\ \cos\theta \cdot \cos\varphi \end{bmatrix}$$

denoting the roll by $\theta$ and the pitch by $\phi$.

By neglecting the acceleration of the wind, this same equation is used for the speed of the aircraft relative to the air:

$$\dot{V}_{air} \approx -\Omega_{IR} \cdot V_{air} + Acc_{IR} + C_{IR} \cdot g \quad (eq\ 7)$$

with $$V_{air} = \begin{bmatrix} Vx_{air} \\ Vy_{air} \\ Vz_{air} \end{bmatrix} \text{ and } \dot{V}_{air} = \begin{bmatrix} \dot{V}x_{air} \\ \dot{V}y_{air} \\ \dot{V}z_{air} \end{bmatrix}$$

In equation 7, the three coordinates of Vair are replaced by their expression as a function of TAS, AOA, and SSA, and the three coordinates of the derivative of Vair are replaced by their expression as a function of the derivatives of TAS, AOA, and SSA.

We thus obtain three linear equations in $\dot{T}AS$; $\dot{A}OA$, $\dot{S}SA$, whose coefficients are dependent on the quantities TAS, AOA, SSA, and whose right-hand side is a function of the inertial measurements and of the quantities TAS, AOA, SSA.

The right-hand side is marred by an error, which is dimensionally equivalent to an acceleration error, and which represents the unknown acceleration of the wind and the acceleration error induced by the inaccuracy of the inertial measurements.

The third step 3 also estimates the second indicator of quality IndQb of the said second intermediate variation δTASb of the speed of the aircraft relative to the surrounding air, of the second intermediate variation δAOAb of the angle of attack of the aircraft, and of the second intermediate variation δSSAb of the angle of sideslip of the aircraft. This second indicator of quality IndQb depends on the accuracy of the measurements involved in the calculation of the second intermediate variations δTASb, δAOAb, and δSSAb (inertial measurements) and of the standard deviation of the acceleration of the wind provided by a modelling well known to the person skilled in the art.

The fourth fusion step 4 can be performed by combining these independent sources of estimation of a linear combination $(K_T \cdot \delta TAS_a + K_A \cdot \delta AOA_a + K_S \cdot \delta SSA_a)$ of the first intermediate variations (δTASa, δAOAa, δSSAa) and of the second intermediate variations (δTASb, δAOAb, δSSAb) into a fused variation of the speed of the aircraft relative to the surrounding air δTAS, a fused variation of the angle of attack of the aircraft δAOA, and a fused variation of the angle of sideslip of the aircraft δSSA, for example by a weighted least squares applied to the 4 equations linking the 3 unknowns δTAS, δAOA, δSSA, the weighting coefficient then being deduced from the error standard deviations IndQa and IndQb.

It is, in this case, the fused variation of the speed of the aircraft relative to the surrounding air δTAS, the fused variation of the angle of attack of the aircraft δAOA, and the fused variation of the angle of sideslip of the aircraft δSSA, which are temporally integrated by the fifth step 5.

Of course, as a variant, it is possible to perform the fifth step 5 of temporal integration before the fourth fusion step 4, in which case the fusion is performed on the estimation of the speed of the aircraft relative to the surrounding air and not its variations.

Likewise, other fusion techniques can be used to couple the two estimations, such as the Kalman filter, as illustrated in FIG. 2. In this case the fourth step can be decomposed into a first sub-step 4a of calculating the said linear combination on the basis of the 3 components of the speed vector of the aircraft relative to the air arising from the fifth step, and of the coefficients calculated on the basis of the laws of local aerodynamic corrections and a second sub-step 4b consisting in calculating an observation equal to the deviation between the linear combination arising from the second step and that arising from the first sub-step of the fourth step, and then in using this observation to correct by Kalman filtering the components of the speed vector of the aircraft relative to the air.

More precisely, we consider the state vector X consisting of the three components Vx, Vy, Vz of the aircraft/air speed vector and of their three derivatives $\dot{V}_X$, $\dot{V}_Y$, $\dot{V}_Z$.

The propagation of the six components of this state vector is deduced from equation 7, and may be written:

$$\dot{V}_{air}(t_n) = -\Omega_{IR} \cdot V_{air}(t_{n-1}) + \text{Acc}_{IR} + C_{IR} \cdot g$$

$$V_{air}(t_n) = V_{air}(t_{n-1}) + \dot{V}_{air}(t_{n-1}) \cdot \Delta T_P,$$

denoting by ΔTP the duration of the propagation step size.

The error committed in this propagation has a covariance matrix Q which is known, on the one hand on the basis of the characteristics of the sensors used, and on the other hand on the basis of the known statistics of the wind turbulence profiles.

We consider the scalar measurement Z $$Z = \int_{\Delta T_R} \frac{-g \cdot V_{ZGEO} \cdot PS_e \cdot \delta t}{R \cdot T} - \delta PS_m,$$

denoting by ΔTR the duration of the adjustment step size.

This measurement is obtained by integrating over the duration ΔTR the quantity under the integral sign and by subtracting δPSm which is the variation of the measurement PSm over this same duration ΔTR.

The measurement Z has an error variance R which is known, on the one hand on the basis of the characteristics of the sensors used, and on the other hand on the basis of the known statistics of the isobar variation profiles.

In accordance with equation 4 this measurement is also equal to $K_T \cdot \Delta TAS + K_A \; \Delta AOA + K_B \cdot \Delta SSA$, denoting by ΔTAS, ΔAOA, ΔSSA the variation of the quantities TAS, AOA, SSA over the duration ΔTR.

It is therefore possible to calculate the observation matrix H which quantifies how a small variation of the state X modifies the quantity $K_T \cdot \Delta TAS + K_A \cdot AOA + K_B \cdot \Delta SSA$.

At each propagation epoch, propagation matrix A is calculated and the state vector X and its covariance matrix P are propagated.

At each adjustment epoch, an observation Y is calculated, equal to the difference between the measurement calculated on the basis of the state X of the filter and the measure Z. The observation matrix H is calculated, and the state X and the covariance P are adjusted by using the well known formulation for the extended Kalman filter.

The three components Vx, Vy, Vz of the aircraft/air speed vector and the associated covariance matrix are thus obtained.

These quantities can easily be re-expressed in the form of the three components TAS, AOA and SSA of the aircraft/air speed vector and the associated covariance matrix.

The fusion of data originating from the inertia and of data originating from the static pressure significantly improves the accuracy of the estimation of the speed vector of the aircraft relative to the surrounding air, but does not allow this estimation to be stabilized well over the long term. Indeed, the use of the static pressure measurement PSm directly improves the estimation of the acceleration of the aircraft relative to the air. The improvement of the estimation of the speed is only the consequence of the improvement of the estimation of the acceleration. The temporal integration of the acceleration to obtain the speed may therefore diverge over the long term.

Stabilization over the long term can be obtained by periodic reinitializations or by setting up an exterior loop as explained hereinabove in the details of the fifth step 5 by implementing well-known techniques of long-term stabilization.

With a periodic reinitialization, there exists a blind zone at the moment of the reinitialization: if the failure of the actual measurement rig (producing a measured speed of the aircraft relative to the surrounding air TASm) intervenes just before the moment of reinitialization, then the estimated TASe speed of the aircraft relative to the surrounding air TAS is falsified and does not make it possible to detect the failure. To counter this blind zone it is possible to use two distinct estimations, whose instants of reinitialization are temporally staggered (by half the reinitialization period).

The exterior loop is based on a correction calculated on the basis of the deviation between the estimated speed of the aircraft relative to the surrounding air TASe and the measured speed of the aircraft relative to the surrounding air TASm produced by the rig for actual measurement of the speed of the aircraft relative to the air. This correction is thereafter applied in the rig for producing the estimated speed of the aircraft relative to the surrounding air TASe to track in the long-term the measured speed of the aircraft relative to the surrounding air TASm. The correction is designed to stabilize the estimation of the estimated speed of the aircraft relative to the surrounding air TASe over the long term while guaranteeing a delay to the absorption of a failure of the measured speed of the aircraft relative to the surrounding air TASm. Thus, by comparing the estimated speed TASe and the measured speed TASm it is possible to detect a failure of the measured speed TASm on condition that this failure develops over a sufficiently short time.

The periodic reinitialization technique can thus be seen as a particular realization of the exterior loop technique: the correction therein is reduced to the sampled identity function (the correction is equal to the estimation).

In both cases, the estimation, coupled with the long-term stabilization, is characterized by its capacity to detect a failure of the rig for actual measurement of the speed of the aircraft relative to the surrounding air, this failure being characterized by a minimum amplitude AMIN and a maximum establishment time TMAX. A failure whose amplitude is greater than AMIN and whose establishment time is less than TMAX is almost certainly detected. A failure of lower amplitude and/or of longer establishment time will probably be undetected.

The use of the "inertia/static pressure" fusion makes it possible to reduce AMIN and to increase TMAX, thereby improving the capacity for detecting a failure in the rig for actual measurement of the speed of the aircraft relative to the surrounding air.

The use of estimations for the purposes of detecting and isolating sensor failures is well known from the prior art. It usually implements two groups of sensors A and B, these two groups being assumed to be independent in relation to failures: the occurrence of a failure in group A is independent of the occurrence of a failure in group B (or, at least, the risk of such a dependency is low).

The measurements provided by the sensors A are presumed to be reliable and used to calculate estimations Best, which are representative of the measurements produced by the sensors B. An analytical redundancy is thus obtained. By comparing the estimations B and the actual measurements B, it is possible to detect a failure, and to isolate the failed sensor or sensors of the group B while ensuring continuity of operation.

As a function of the operational constraints, the comparison can be permanent (with an increased risk of false-alarm) or triggered upon an event (for example upon the detection of an incoherence between sensors of group B) with an increased risk of missed detection. The association of physical redundancy (measurement) and of analytical redundancy (estimation) thus offers multiple possibilities in the architecture of failure detection and isolation systems.

FIG. 3 illustrates a processor 100 and various measurement devices 102 used to perform the calculations described herein.

During the estimation of the speed of the aircraft relative to the surrounding air by inertia/static pressure fusion described in the present request, the group of sensors A is as follows:
  inertial sensor 104
  geographical vertical speed sensor 106
  static pressure probe 108
  air temperature probe 110

The inertial sensor 104 is typically an IRS (the acronym standing for "Inertial reference system") or an AHRS (the acronym standing for "Attitude and heading reference system") and provides the following measurements: three acceleration components (AccX, AccY, AccZ), three rotation speed components (p, q, r), two angles of roll and pitch. The gravity g at the current point is also known, via an appropriate gravity model.

The measurement of geographical vertical speed (vertical speed of the aeroplane relative to the Earth) 106 typically arises from a GPS receiver, or from any radio or optical system making it possible to measure the geographical altitude relative to the Earth. It can also be obtained on the basis of the inertial measurements, on condition that the fact that the inertial vertical speed is divergent is taken into account. In all cases this measurement of geographical vertical speed must be independent of the corrected static pressure SSEC.

The group of sensors B comprises anemometric sensors 112 measuring the three components of the speed vector (Vair (TAS, AOA, SSA)).

For certain applications, the group of sensors B can be reduced to two or one of the three components of the speed vector.

For example: only the sensors measuring the speed of the aircraft relative to the surrounding air TAS and the angle of attack of the aircraft AOA are in group B since the topology of the mounting of the probes on the aircraft creates a weak coupling between the static pressure and the angle of sideslip of the aircraft SSA. Thus the probe for measuring the angle of sideslip SSA does not intervene in the estimation, neither in A nor in B.

In another example, the sensors measuring the angle of attack of the aircraft AOA and the angle of sideslip of the aircraft SSA are assumed to be reliable and are in group A, only the source of the speed of the aircraft relative to the surrounding air TAS is in group B.

What is claimed is:

1. A method for estimation of the speed of an aircraft relative to the surrounding air, of the angle of attack of the aircraft, and of the angle of sideslip of the aircraft, in a reference frame tied to the aircraft, comprising:
  using a vertical speed device on the aircraft to measure a geographical vertical speed of the aircraft;

using a temperature probe on the aircraft to measure a temperature of air surrounding the aircraft;
using a static pressure probe on the aircraft to measure a static pressure surrounding the aircraft;
using a processor on the aircraft to:
estimate an estimated static pressure on the basis of measurements of the geographical vertical speed of the aircraft measured by the vertical speed device, of measurements of the temperature of the surrounding air measured by the temperature probe, of reinitializations of the estimated static pressure, and of a feedback of the estimated static pressure, by integration over a vertical path of a hydrostatic equation;
estimate a linear combination of a first intermediate variation of the speed of the aircraft relative to the surrounding air, of a first intermediate variation of the angle of attack of the aircraft and of a first intermediate variation of the angle of sideslip of the aircraft on the basis of a deviation between a variation of estimated static pressure and a variation of measured static pressure measured by the static pressure probe, the linear combination using coefficients calculated on the basis of the laws of local aerodynamic correction dependent on the aircraft, the speed of the aircraft relative to the surrounding air, the angle of attack of the aircraft, and the angle of sideslip of the aircraft,
estimate a first indicator of quality of the linear combination estimated by the estimating the linear combination;
estimate a second intermediate variation of the speed of the aircraft relative to the surrounding air, a second intermediate variation of the angle of attack of the aircraft and a second intermediate variation of the angle of sideslip of the aircraft, on the basis of inertial measurements, and of a feedback of the estimated speed of the aircraft relative to the surrounding air at output, of a feedback of the estimated angle of attack of the aircraft at output, and of a feedback of the estimated angle of sideslip of the aircraft at output, by likening the speed vector of the aircraft relative to the surrounding air to a speed vector of the aircraft relative to an inertial reference frame obtained by integration of the components of a measured acceleration vector (Inertial measurements), corrected for the kinematic effect of the reference frame tied to the aircraft and increased by the gravity projected into the reference frame tied to the aircraft; and consisting in estimating a second indicator of quality of the second intermediate variations;
fuse the second intermediate variation of the speed of the aircraft relative to the surrounding air, second intermediate variation of the angle of attack of the aircraft, and second intermediate variation of the angle of sideslip of the aircraft respectively with the first intermediate variation of the speed of the aircraft relative to the surrounding air, first intermediate variation of the angle of attack of the aircraft, and first intermediate variation of the angle of sideslip of the aircraft, by filtering of least squares type weighted by the first and second indicators of quality or by a filtering of Kalman type; and of fusing the first and second indicators of quality into a fused indicator of quality on the basis of the error variance estimated by the filtering;
perform a temporal integration of the fusion of the first and second intermediate variations, using reinitializations of the estimated speed of the aircraft relative to the surrounding air, of the estimated angle of attack of the aircraft, and of the estimated angle of sideslip of the aircraft; and generate an output for the operator of the aircraft so as to deliver at the output an estimated speed of the aircraft relative to the surrounding air, an estimated angle of attack of the aircraft, and an estimated angle of sideslip of the aircraft.

2. The method of claim 1, in which the reinitializations of the estimated speed of the aircraft relative to the surrounding air, of the estimated angle of attack of the aircraft and of the estimated angle of sideslip of the aircraft use respectively measurements of the speed of the aircraft relative to the surrounding air that are corrected by the laws of local aerodynamic correction, measurements of the angle of attack of the aircraft that are corrected by the laws of local aerodynamic correction, and measurements of the angle of sideslip of the aircraft that are corrected by the laws of local aerodynamic correction.

3. The method of claim 1, in which the reinitializations of the estimated static pressure of the estimating the estimated static pressure use measurements of the static pressure that are corrected by the laws of local aerodynamic correction.

4. The method of claim 3, in which the reinitializations of the estimated speed of the aircraft relative to the surrounding air, of the estimated angle of attack of the aircraft and of the estimated angle of sideslip of the aircraft use respectively measurements of the speed of the aircraft relative to the surrounding air that are corrected by the laws of local aerodynamic correction, measurements of the angle of attack of the aircraft that are corrected by the laws of local aerodynamic correction, and measurements of the angle of sideslip of the aircraft that are corrected by the laws of local aerodynamic correction.

5. The method of claim 1, in which the fusion of the second intermediate variation further comprises:
calculating the linear combination using coefficients calculated on the basis of the laws of local aerodynamic correction dependent on the aircraft, the speed of the aircraft relative to the surrounding air, the angle of attack of the aircraft, and the angle of sideslip of the aircraft; and
correcting by Kalman filtering using at input the estimations of the linear combination that are provided by the estimating the linear combination and by the calculating the linear combination using coefficients.

6. The method of claim 5, in which the reinitializations of the estimated speed of the aircraft relative to the surrounding air, of the estimated angle of attack of the aircraft and of the estimated angle of sideslip of the aircraft use respectively measurements of the speed of the aircraft relative to the surrounding air that are corrected by the laws of local aerodynamic correction, measurements of the angle of attack of the aircraft that are corrected by the laws of local aerodynamic correction, and measurements of the angle of sideslip of the aircraft that are corrected by the laws of local aerodynamic correction.

7. The method of claim 5, in which the reinitializations of the estimated static pressure of the estimating the estimated static pressure use measurements of the static pressure that are corrected by the laws of local aerodynamic correction.

8. The method of claim 7, in which the reinitializations of the estimated speed of the aircraft relative to the surrounding air, of the estimated angle of attack of the aircraft and of the estimated angle of sideslip of the aircraft use respectively measurements of the speed of the aircraft relative to the surrounding air that are corrected by the laws of local aerodynamic correction, measurements of the angle of attack of the aircraft that are corrected by the laws of local aerodynamic correction, and measurements of the angle of sideslip of the aircraft that are corrected by the laws of local aerodynamic correction.

9. The method of claim 1 wherein the vertical speed device on the aircraft to measure geographical vertical speed of the aircraft is an inertial system.

10. The method of claim 1 wherein the vertical speed device on the aircraft to measure geographical vertical speed of the aircraft is global positioning system (GPS) receiver.

11. A system for estimation of the speed of an aircraft relative to the surrounding air, of the angle of attack of the aircraft, and of the angle of sideslip of the aircraft, in a reference frame tied to the aircraft, the system comprising:
  a vertical speed device on the aircraft to provide measurements of a geographical vertical speed of the aircraft;
  a temperature probe on the aircraft to provide measurements of a temperature of air surrounding the aircraft;
  a static pressure probe on the aircraft to provide measurements of a static pressure of air surrounding the aircraft; and
  a processor adapted for executing instructions that, when executed, cause the processor to:
  estimate an estimated static pressure on the basis of the measurements of the geographical vertical speed of the aircraft, of the measurements of the temperature of the surrounding air, of reinitializations of the estimated static pressure, and of a feedback of the estimated static pressure, by integration over a vertical path of a hydrostatic equation;
  estimate a linear combination of a first intermediate variation of the speed of the aircraft relative to the surrounding air, of a first intermediate variation of the angle of attack of the aircraft and of a first intermediate variation of the angle of sideslip of the aircraft on the basis of a deviation between a variation of an estimated static pressure and a variation of a measurement of the static pressure, the linear combination using coefficients calculated on the basis of the laws of local aerodynamic correction dependent on the aircraft, the speed of the aircraft relative to the surrounding air, the angle of attack of the aircraft, and the angle of sideslip of the aircraft;
  estimate a first indicator of quality of the estimated linear combination of the first intermediate variation;
  estimate a second intermediate variation of the speed of the aircraft relative to the surrounding air, a second intermediate variation of the angle of attack of the aircraft and a second intermediate variation of the angle of sideslip of the aircraft, on the basis of inertial measurements, and of a feedback of the estimated speed of the aircraft relative to the surrounding air at output, of a feedback of the estimated angle of attack of the aircraft at output, and of a feedback of the estimated angle of sideslip of the aircraft at output, by likening the speed vector of the aircraft relative to the surrounding air to a speed vector of the aircraft relative to an inertial reference frame obtained by integration of the components of a measured acceleration vector (Inertial measurements), corrected for the kinematic effect of the reference frame tied to the aircraft and increased by the gravity projected into the reference frame tied to the aircraft; and consisting in estimating a second indicator of quality of the second intermediate variations;
  fuse the second intermediate variation of the speed of the aircraft relative to the surrounding air, second intermediate variation of the angle of attack of the aircraft, and second intermediate variation of the angle of sideslip of the aircraft respectively with the first intermediate variation of the speed of the aircraft relative to the surrounding air, first intermediate variation of the angle of attack of the aircraft, and first intermediate variation of the angle of sideslip of the aircraft, by filtering of least squares type weighted by the first and second indicators of quality or by a filtering of Kalman type; and of fusing the first and second indicators of quality into a fused indicator of quality on the basis of the error variance estimated by the filtering; and
  perform a temporal integration of the fusion of the second intermediate variation, using reinitializations of the estimated speed of the aircraft relative to the surrounding air, of the estimated angle of attack of the aircraft, and of the estimated angle of sideslip of the aircraft so as to deliver, at an output of the device, an estimated speed of the aircraft relative to the surrounding air, an estimated angle of attack of the aircraft, and an estimated angle of sideslip of the aircraft.

12. An aircraft comprising the system of claim 11.

13. The system of claim 11 wherein the vertical speed device on the aircraft to measure geographical vertical speed of the aircraft is an inertial system.

14. The system of claim 11 wherein the vertical speed device on the aircraft to measure geographical vertical speed of the aircraft is global positioning system (GPS) receiver.

* * * * *